United States Patent [19]
Trbovich

[11] Patent Number: 6,031,452
[45] Date of Patent: *Feb. 29, 2000

[54] TURN SIGNAL AND BRAKE SIGNAL COMBINATION

[76] Inventor: Jeffrey Alan Trbovich, 124 Longvue Dr., McMurray, Pa. 15317

[ * ] Notice: This patent is subject to a terminal disclaimer.

[21] Appl. No.: 09/366,743

[22] Filed: Aug. 4, 1999

Related U.S. Application Data

[63] Continuation-in-part of application No. 09/017,031, Feb. 2, 1998, Pat. No. 5,955,943.

[51] Int. Cl.[7] .................................................. B60Q 1/34
[52] U.S. Cl. ........................... 340/475; 340/468; 340/458; 307/10.8
[58] Field of Search .................................. 340/475, 468, 340/458, 469, 470, 431, 472; 307/10.8

[56] References Cited

U.S. PATENT DOCUMENTS

| | | | |
|---|---|---|---|
| 3,883,845 | 5/1975 | DeVita | 340/475 |
| 3,970,860 | 7/1976 | Purdy | 340/477 |
| 4,845,465 | 7/1989 | Kruse et al. | 340/468 |
| 5,264,827 | 11/1993 | Giovanni | 340/477 |
| 5,966,943 | 9/1999 | Trbovich | 340/475 |

*Primary Examiner*—Julie Lieu
*Attorney, Agent, or Firm*—William L. Krayer

[57] ABSTRACT

A brake and turn signal circuit permits a brake lamp to be used as a turn signal when both the brakes and turn signal are applied. Certain of the lamps may be caused to blink in a predetermined period and sequence particularly when both the brake and turn signals are actuated.

5 Claims, 3 Drawing Sheets

TURN SIGNAL AND BRAKE SIGNAL COMBINATION

RELATED APPLICATION

This application is a continuation-in-part of my application Ser. No. 09/017,031 filed Feb. 2, 1998, now U.S. Pat. No. 5,995,943.

TECHNICAL FIELD

This invention relates to a system and circuit for turn signals and brake lamps, as applied to motorcycles and other vehicles. In the system, a lamp which is normally a brake lamp is used for a turn signal while permitting other brake lamps to function. Pulsed turn signal current impedes the passage of current for normal operation of the brake lamps while the turn signal operates. The illuminating turn signal currents are sequenced or delayed at predetermined cascading intervals, typically 100 msec., to the dual outputs provided for each vehicle side.

BACKGROUND OF THE INVENTION

The present inventor has observed that brake and turn signal displays are not as readily visible as could be the case. Many motorcycles have only a single brake lamp on the fender with optional auxiliary brake lamps mounted directly above the fender lamp and in the higher mounted rear trunk. Turn signal lamps are typically mounted to the sides of the fender brake lights, making them low and often difficult to see. It is therefore desirable to utilize the potential illumination of the brake lamps to maximize turn signal visibility, substantially increasing rider safety and avoiding rear end collisions. In practice this means combining the functions of the two types of signals while also providing a stepped or cascade effect of lamp sequence.

In U.S. Pat. No. 5,028,908, Juang discloses a control circuit for vehicle taillights in which the turn signal lights are utilized to provide extra signals when the brake is applied.

Heidman, in U.S. Pat. No. 4,638,296, flashes a brake lamp alternately with a turn signal lamp when the brake is not activated but the turn signal is.

These and other prior patents do not combine the function of the brake and turn signal lamps in the manner I do, to provide a maximum degree of safety for the user.

SUMMARY OF THE INVENTION

My invention is a system and circuit for utilizing a lamp or lamps which are normally brake lamps as turn signal lamps even when the brakes are applied at the same time as the turn signal. In addition to this utilization of the lamps, I also make provisions for cascading the delay, preferably 100 msec., for the first auxiliary lamp and 200 msec for the second auxiliary lamp while in the turn signal mode. It is important to note that while these signals are delayed they are desirably the same duration as the original turn signal illumination. This stepping or cascading, by any convenient length of time, will maximize turn signal visibility.

For the brake signal of a motorcycle, I provide a central brake lamp and preferably up to two auxiliary brake lamps on each side of the motorcycle, preferably one on the trunk and one slightly above and outside the central fender brake lamp. For signaling a turn, I provide a standard turn signal lamp on each side of the motorcycle, and a means for temporarily converting the appropriate auxiliary brake lamps into a turn signal when a turn signal is applied, while at the same time cascading or delay sequencing the turn signal illuminations. If the brakes are applied at the same time as the turn signal, the central brake lamp operates and also the auxiliary brake lamps on the side opposite the turn will operate, while the other auxiliary brake lamps perform as cascaded turn signals.

My invention will be discussed with particular reference to a motorcycle, but it should be understood that the same principles can be applied to other vehicles such as automobiles and trucks. While the motorcycle is discussed with reference to a central brake lamp, the reader will readily realize that a larger vehicle may use two such brake lamps which may be operated simultaneously, and that this is contemplated within my invention. Likewise a motorcycle may have several brake lamps that typically are not used for turn signal illumination.

DETAILED DESCRIPTION OF THE INVENTION

Figure 1:
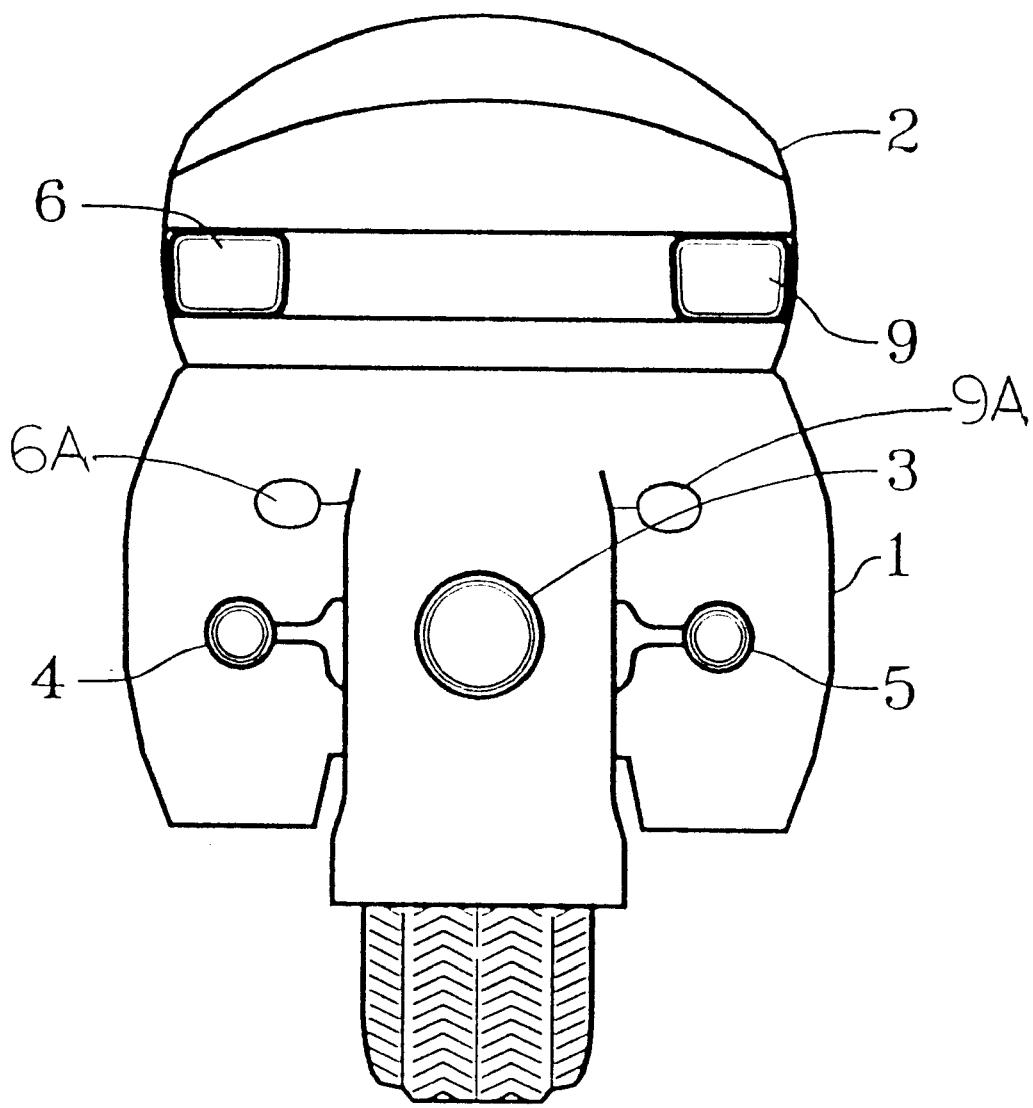
FIG. 1 shows the rear of a motorcycle equipped with my lights.

Referring now to FIG. 1, the motorcycle 1 has a trunk 2, a central brake lamp 3, and more or less standard turn signal lamps 4 and 5. In addition, the motorcycle is equipped with auxiliary brake lamps 6, 6A, 9, and 9A which are placed on the sides of the back of the motorcycle.

The invention will be discussed with respect to three basic conditions: (1) where the brakes are applied (2) where a turn signal is applied, and (3) where both a turn signal and the brakes are applied.

In the first condition, where the brakes are applied, central brake lamp 3 and the auxiliary brake lamps 6, 6A, 9 and 9A are activated continuously throughout the application of the brakes, thus giving drivers behind the motorcycle an excellent indication that the brakes are being applied.

In the second condition, where a turn signal is applied, either lamps 4, 6, and 6A or lamps 5, 9 and 9A will blink and sequence so long as the left or right turn signal is activated. The duration of the activation of lamps 6 and 6A, or 9 and 9A, is always the same as the original driving turn signal pulse for turn signal lamps 4 or 5. It is important to note that various turn signal pulse durations are available commercially or can be specified, as is known in the art, and can be varied on a vehicle by varying battery voltages and other normal operating conditions. It is desirable to illuminate the auxiliary lamps for the exact duration of the original turn signal pulse.

In the third condition, where both the brakes and a turn signal are applied at the same time, the central brake lamp 3 and the auxiliary brake lamp on the side opposite the turn will be activated continuously as long as the brakes are applied, while the appropriate turn signal group—either lamps 4, 6, and 6A or 5, 9 and 9A—will blink in a delay sequence duplicating the original turn signal pulse, so long as the turn signal is applied, and, optionally as will be seen below, for an additional short period of time such as one half to three seconds. The flashing side auxiliary, which is 6 and 6A or 9 and 9A, will remain de-energized or off.

Hazard or other four way flashers may activate both turn signal sequences together.

Figure 2:
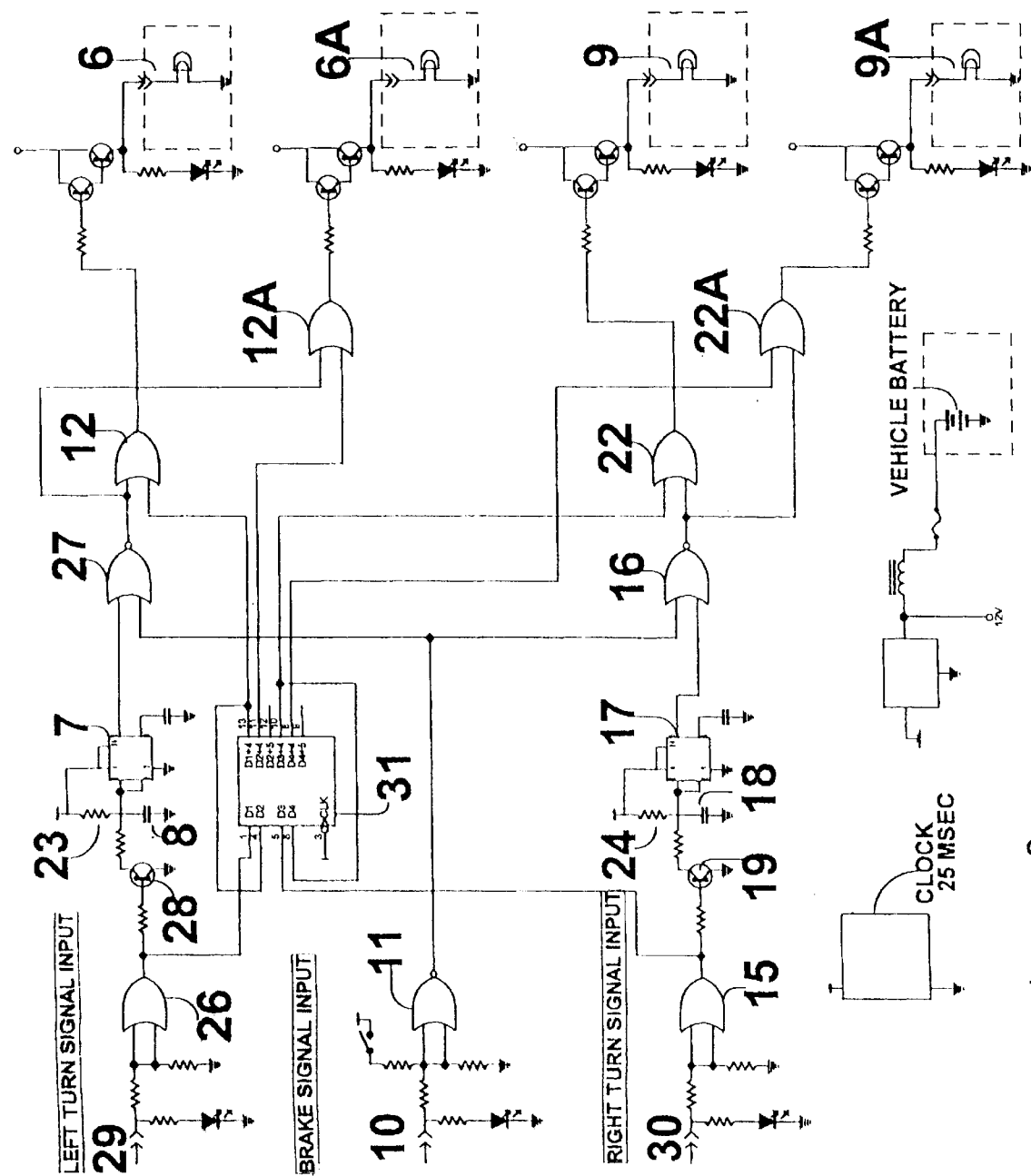
FIG. 2 is a circuit for operating my invention.

In FIG. 2, a preferred circuit is described for operation of the invention to achieve its objective.

In the first condition, where the brakes are applied but a turn signal is not, a brake signal enters the circuit through input 10 and encounters NOR gate 11, which is used for signal isolation and conditioning. The low voltage output from NOR gate 11 when the brake is on is transmitted to NOR gates 27 and 16. The output of NOR gates 27 and 16 then go high, driving OR gates 12, 12A, 22, and 22A to illuminate lamps 6, 6A, 9, and 9A. Brake lamp 3 (FIG. 1) is operated directly by th e brake signal entering at input 10 by a simple conventional connection not shown.

If there is no brake signal but a pulsed turn signal enters the circuit through input 29 or 30, NOR gate 26 or 15 is used for signal isolation and conditioning. The high pulsed outputs of NOR gates 26 and 15 are divided and, since the circuits for inputs 29 and 30 are the same, the action of the circuit will be described with respect to a pulsed turn signal at input 29. The high output of OR gate 26 goes directly to shift register 31, input D1. The output of D1, D1+4, is delayed by four times the input clock duration or 100 msec. This delay can be increased or decreased by changing the frequency of the input clock to the shift register. Output D1+4 is split. It drives OR gate 12, which illuminates lamp 6, and is also fed into D2. The output of D2, D2+4, is also delayed by four times the input clock duration, or 100 msec., and drives OR gate 12A, which illuminates lamp 6A. These delay times can be easily increased or decreased by providing a variable resistor in the clock frequency circuit for end user adjustment. As indicated above, the operation of the right turn signal input 30 is similar, through OR gate 15, OR gate 22, lamp 9, OR gate 22A, and lamp 9A.

Figure 3:
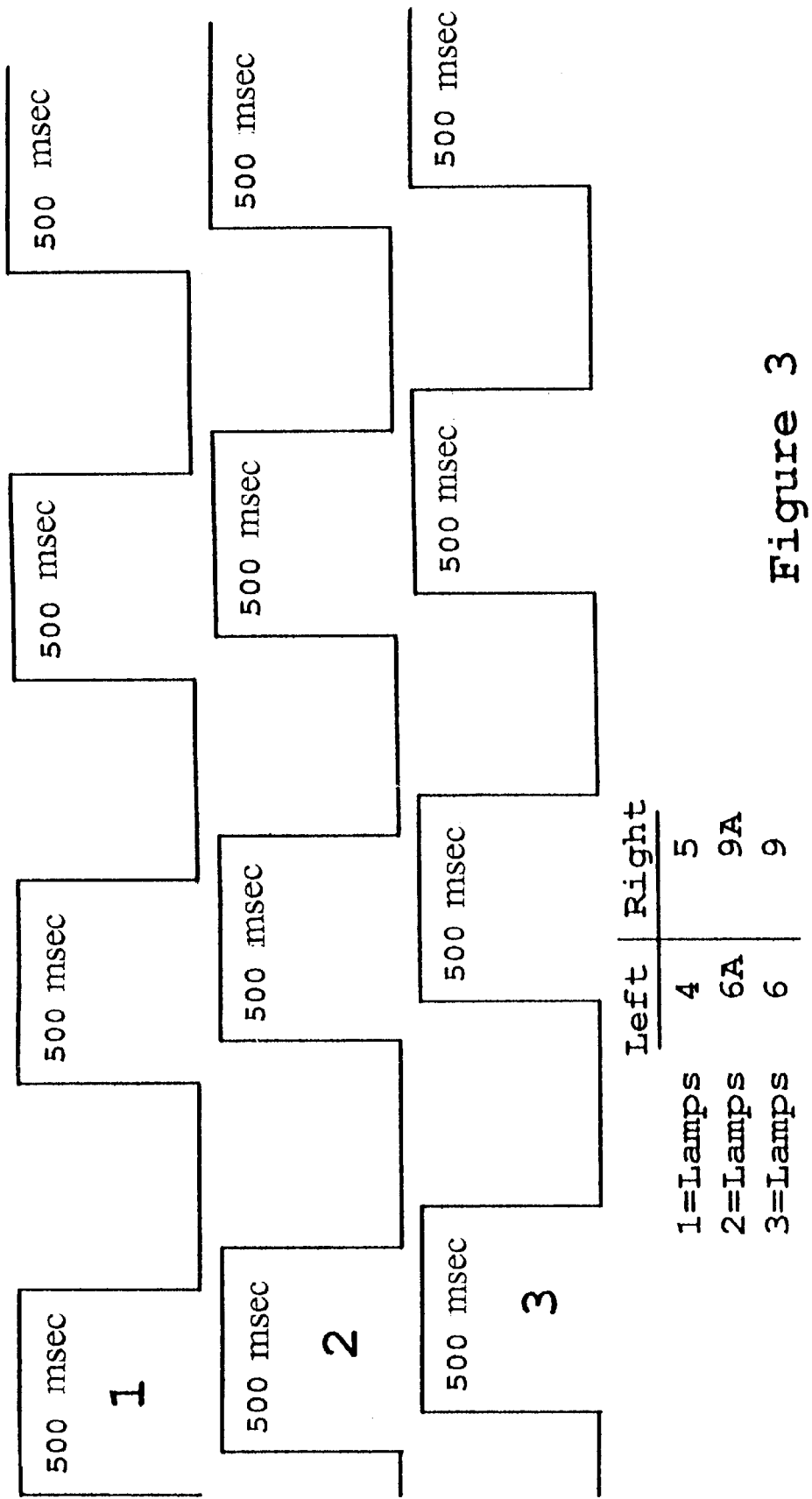
FIG. 3 is a simple graph showing the auxiliary light sequence during turn signal operation.

Referring to FIG. 3, a nominal delay of 100 msec. was selected for discussion purposes. A practical range of delay would be from 10 msec., or almost none, to 300 msec. This would be accomplished through component selection of the clock which drives the shift register 31.

In the third condition, where both the turn signal and brakes are applied, the pulsed signal through OR gate 26 drives transistor 28, which discharges capacitor 8 on the input of timer 7, making the output of timer 7 go high, disabling the brake signal at NOR gate 27. Thus the circuit normally permits the brake signal to operate until the turn signal is applied; at that point the timer 7 interjects a high output to NOR gate 27, which interrupts the brake signal at OR gates 12 and 12A, coming from NOR gate 11. The auxiliary brake lamps then become pulsed and cascaded, as described in the previous condition, in effect a turn signal.

It should be noted that the time constant of capacitor 8, controlled through timing resistor 23, should be longer than the period between pulses of the pulsed turn signal input. This will make a continuous high output from timer 7 to NOR gate 27, thus continuously disabling the brake signal, while the divided turn signal goes directly to shift register 30, for delay enhancement, which then drives OR gates 12 and 12A to operate lamps 6 and 6A. The R-C time constant may be varied through charging resistor 23 but this will not be necessary because circuit configuration has taken into account the maximum practical delay between turn signal pulses. Likewise, variable resistor 24 controls the time constant of capacitor 18. Transistor 19, timer 17, NOR gate 16, and OR gates 22 and 22A all function to operate lamp 9 and 9A as counterpart transistor 28, timer 7, and OR gates 12 and 12A in the description just given of the operation of the lamps 6 and 6A.

I claim:

1. A brake and turn signal circuit comprising: (a) a brake signal circuit including a brake signal input, a plurality of NOR gates, an OR gate driven by each NOR gate, and means actuated by each of said OR gates for illuminating a brake lamp, (b) two turn signal circuits, each of said turn signal circuits being divided into (i) a direct route to one of said output NOR gates, and (ii) a timing circuit for disabling at least one of said NOR gates while said turn signal is on, and (3) means for delaying each activation of at least one of said brake signal circuit and said turn signal circuit for a predetermined period, when said brake signal circuit and one of said turn signal circuits are activated.

2. A brake and turn signal circuit of claim 1 wherein said predetermined period is from 10 msec. to 300 msec.

3. A brake and turn signal circuit of claim 1 wherein each of said turn signal circuits contains at least two lamps.

4. A brake and turn signal circuit of claim 1 wherein said means for delaying is a shift register.

5. A brake and turn signal circuit of claim 2 wherein said predetermined period is about 100 msec.

* * * * *